L. D. HOWARD.
Bevel.
No. 70,570.
Patented Nov. 5, 1867.
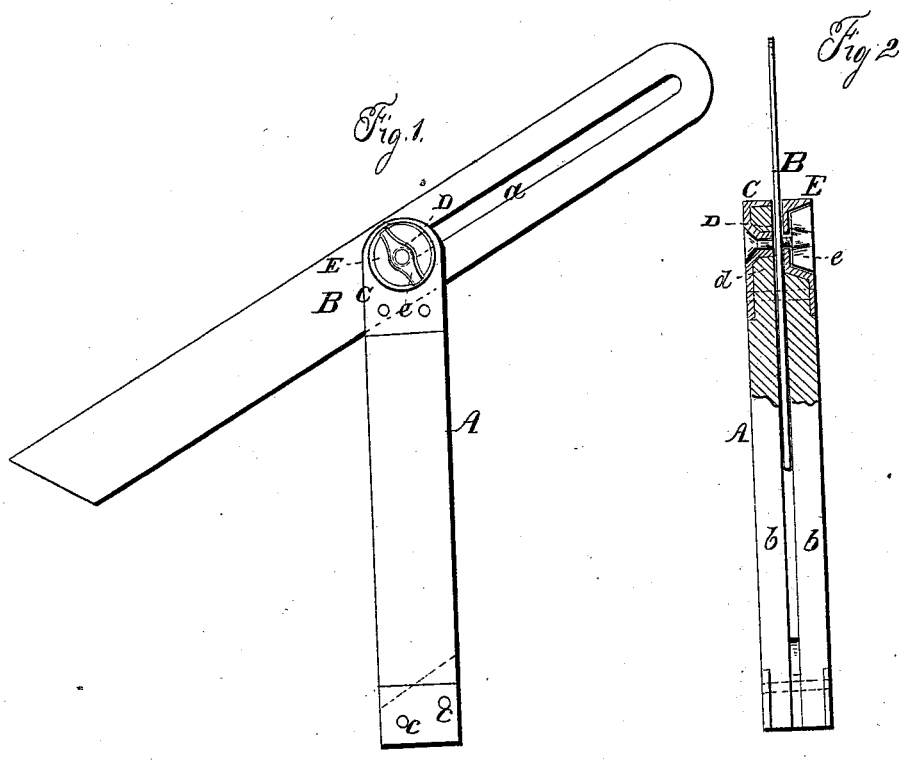

United States Patent Office.

LEONARD D. HOWARD, OF ST. JOHNSBURY, VERMONT.

Letters Patent No. 70,570, dated November 5, 1867.

IMPROVEMENT IN BEVELS.

The Schedule referred to in these Letters Patent and making part of the same.

TO ALL WHOM IT MAY CONCERN:

Be it known that I, LEONARD D. HOWARD, of St. Johnsbury, in the county of Caledonia, and State of Vermont, have invented a new and useful Improvement in Bevels; and I do hereby declare that the following is a full, clear, and exact description thereof, which will enable others skilled in the art to make and use the same, reference being had to the accompanying drawings, and to the letters of reference marked thereon.

This invention relates to a new and useful improvement in joiners' bevels, and it consists in having the screw and thumb-nut arranged or applied in such a manner that the head of the screw and the thumb-nut which secure the blade to the handle or stock, will be flush with the sides of the latter. In the accompanying sheet of drawings—

Figure 1 is a side view of a bevel provided with my invention.
Figure 2, an edge view of the same.
Similar letters of reference indicate like parts.

A represents the handle or stock of the bevel, and B the blade thereof. The blade B is constructed, as usual, of steel, with an oblong slot, $a$, through it, and the handle or stock is constructed of wood, and in two parts $b\ b$, connected together at one end by a metal cap, C, and at the opposite end by screws $c$, a slot or space being allowed between the two parts to receive the blade B. The metal cap C is formed with a concave, $d$, at one side, to serve as a countersink to receive the head of the screw D which connects the blade to the handle or stock, so that the screw-head will be "flush" with the side of the cap and handle or stock, as shown clearly in fig. 2. At the opposite side of the cap C there is a socket, E, of sufficient dimensions to receive the nut $e$ of the screw, so that it will be flush with the side of the cap and handle or stock, (see fig. 2.) The screw D passes through the slot $a$ in the blade, and the latter may be secured at any desired point within the scope of its adjustment by screwing up the nut $e$, the same as in ordinary bevels.

It will be seen that, by providing countersinks for the screw and the nut, the handle or stock may be laid or adjusted flatwise against or upon any surface, and the device used with greater facility than hitherto.

Having thus described my invention, I claim as new, and desire to secure by Letters Patent—

The applying of a blade-screw and nut to a bevel in the manner shown, or in an equivalent way, so that the head of the screw and the nut will be flush with the sides of the handle or stock, as set forth.

I also claim the cap C applied to the end of the handle or stock, and provided with the concave or countersink $d$ at one side, and the socket E at the opposite side, to receive, respectively, the screw-head and the screw-nut, substantially as shown and described.

LEONARD D. HOWARD.

Witnesses:
H. G. W. BURROWS,
ARTHUR E. WHITNEY.